May 13, 1952 R. A. ROBERT 2,596,436
FOLDING WING FOR AIRCRAFT
Filed Jan. 21, 1948 9 Sheets-Sheet 1
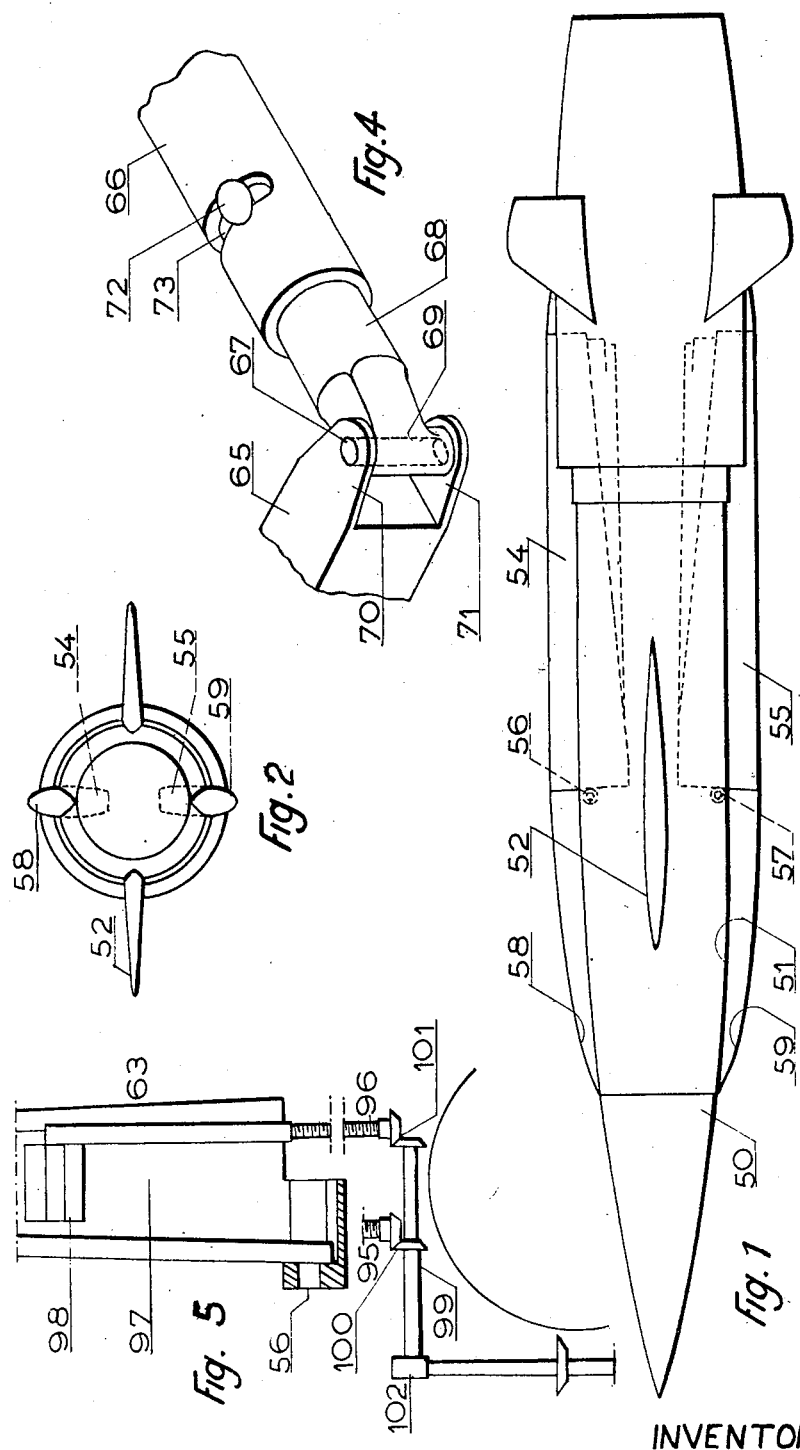
INVENTOR
ROGER AIME ROBERT
BY Haseltine, Lake Co.
AGENTS May 13, 1952     R. A. ROBERT     2,596,436
FOLDING WING FOR AIRCRAFT
Filed Jan. 21, 1948     9 Sheets-Sheet 3
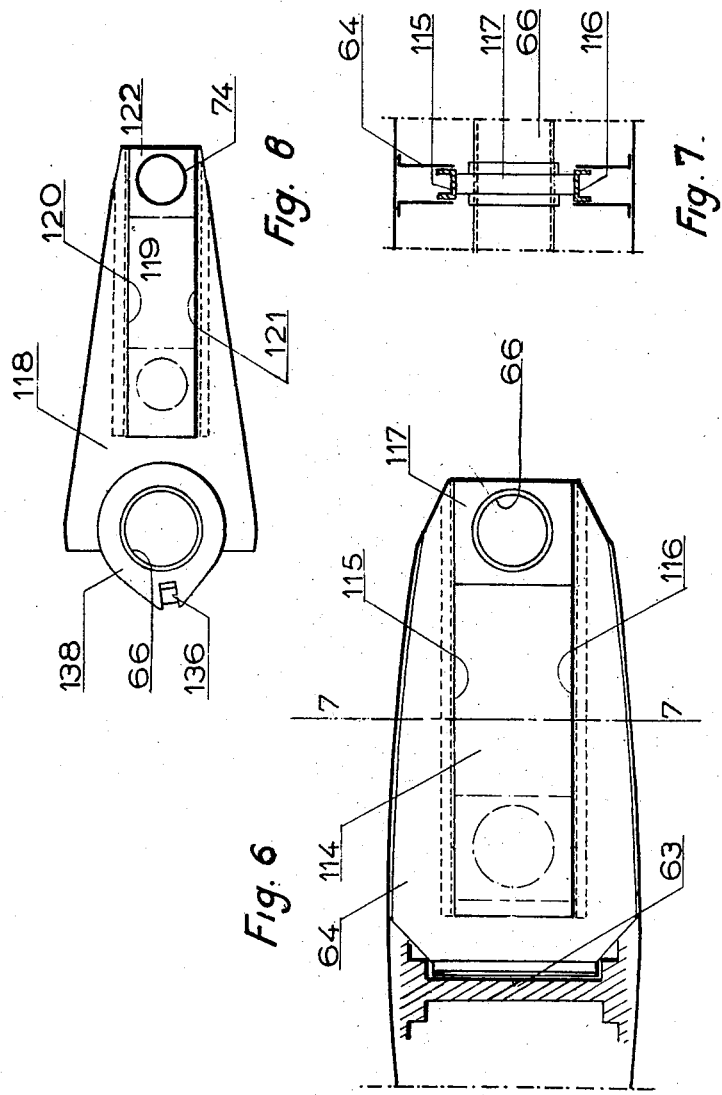
INVENTOR
ROGER AIME ROBERT
BY Hazeltine Lake Co.
AGENTS

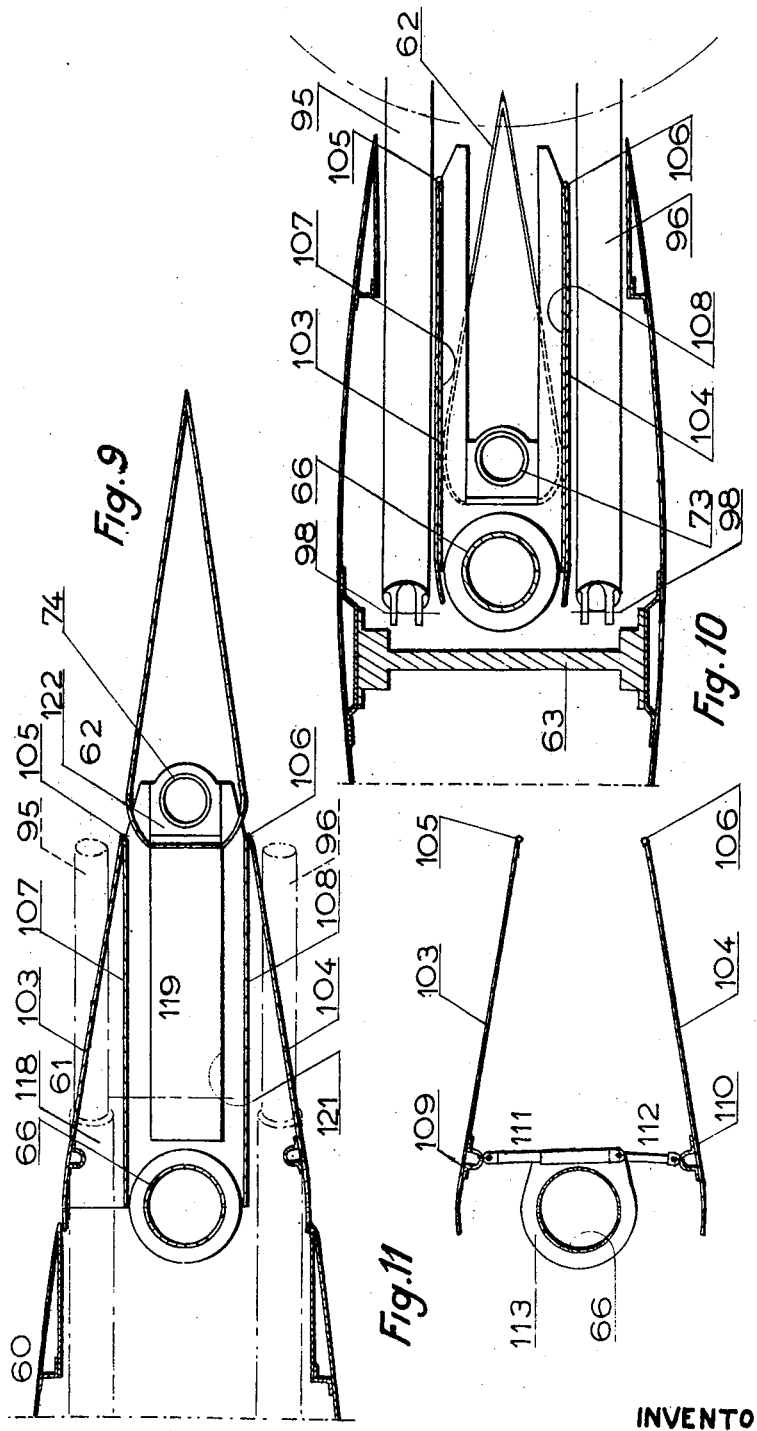

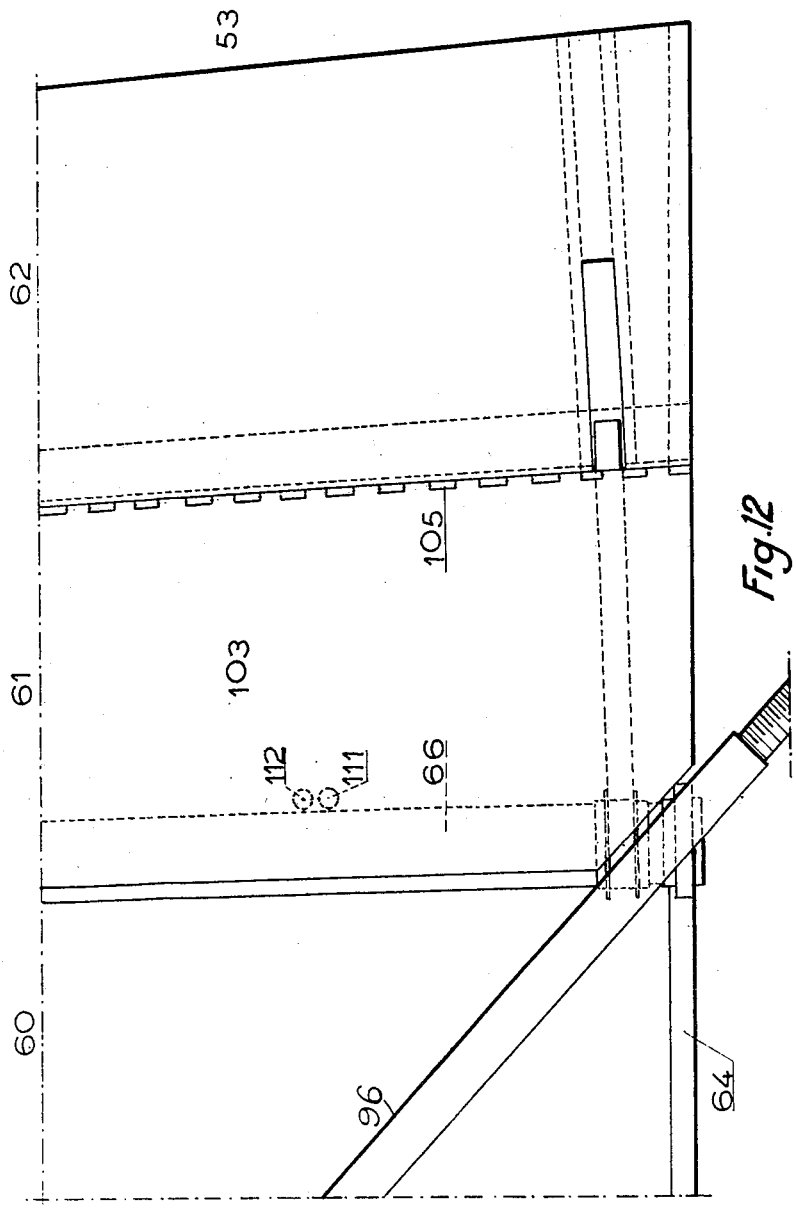

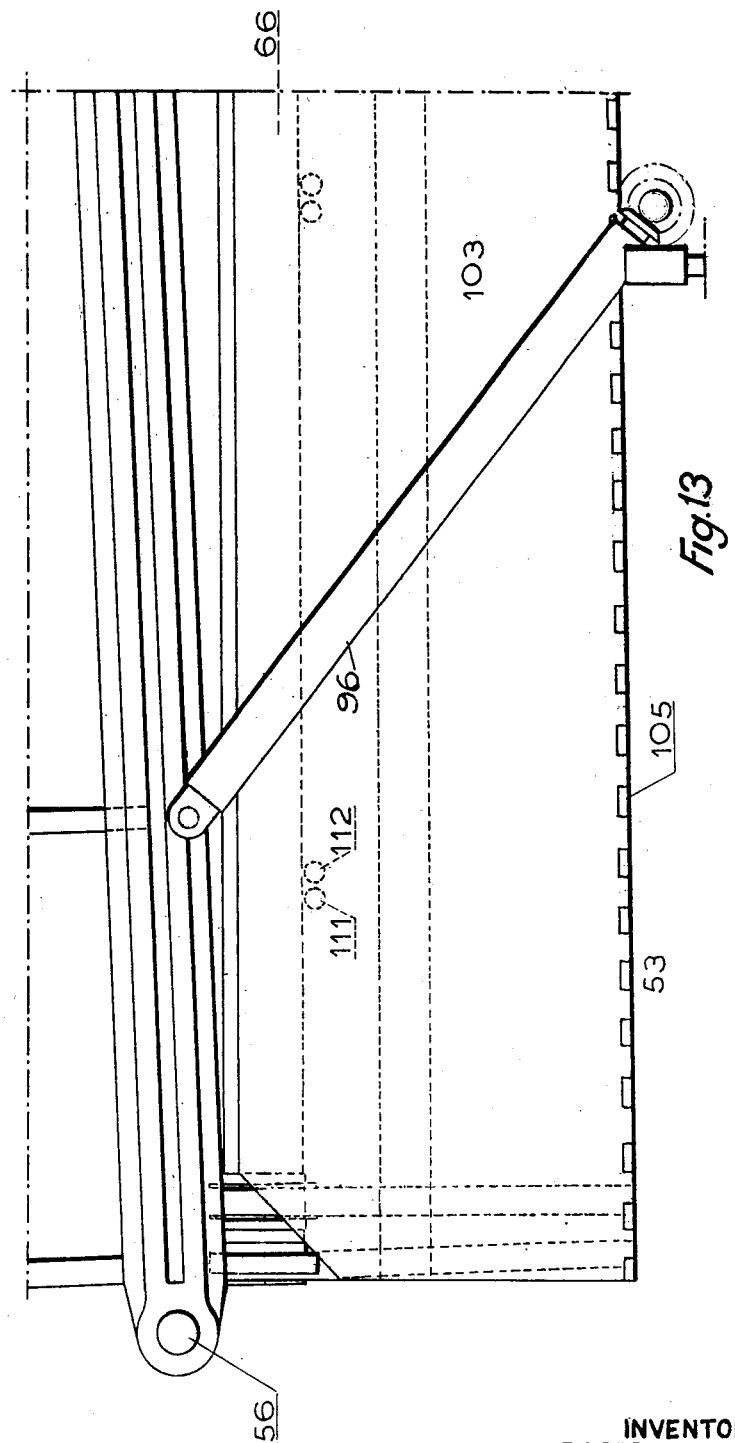

May 13, 1952    R. A. ROBERT    2,596,436
FOLDING WING FOR AIRCRAFT
Filed Jan. 21, 1948    9 Sheets-Sheet 8

INVENTOR
ROGER AIME ROBERT
BY Haseltine Lake Co.
AGENTS

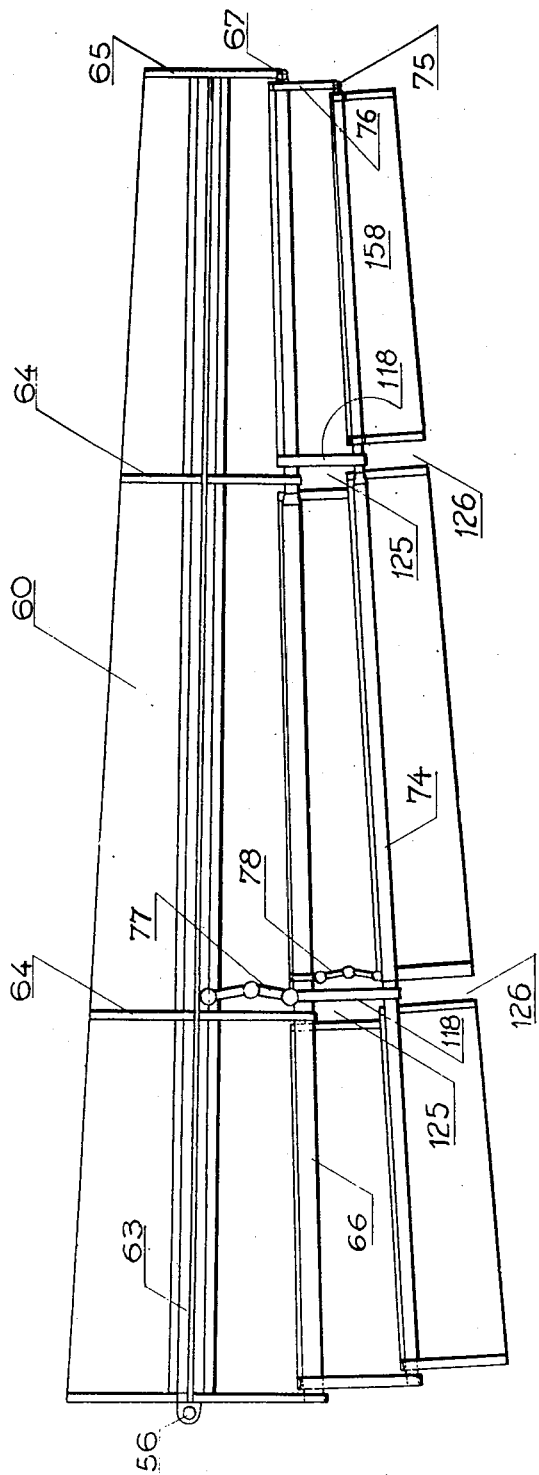

Patented May 13, 1952

2,596,436

UNITED STATES PATENT OFFICE 2,596,436

FOLDING WING FOR AIRCRAFT

Roger Aimé Robert, Boulogne-sur-Seine, France

Application January 21, 1948, Serial No. 3,437
In France March 11, 1947

9 Claims. (Cl. 244—49)

The present invention relates to an aircraft having two surfaces which are alternatively operative as lifting surfaces and arranged on the fuselage in substantially perpendicular planes, one of the surfaces being used for low speed flight and the other for very high, even supersonic speed flight. At least one of the surfaces, and in any case the one which is used for lift purposes at low speed flight and which, consequently, is of relatively large dimension, is retracted when not in lift position. The pilot changes over from one surface to the other by rotating the two surfaces together, or the whole aircraft, about a central longitudinal axis.

More specifically, the invention relates to a retractable aerofoil or wing, which is a part of the supersonic airplane hereabove mentioned, but which may be also used on other airplanes, particularly those adapted to be lodged in a narrow space as, for instance, within a plane-carrier.

One object of the invention is a wing which can easily be folded along the fuselage of an airplane by a simple and safe manipulation.

Another object in this case is a folding wing having qualities of strength and lightness comparable to a fixed wing.

The folding wing according to the invention is formed by rigid elements and its depth, when folded, is smaller than when extended. The fuselage may therefore be kept within minimum dimensions and the space to be reserved within the fuselage for the folded wing is minimized.

According to the invention, the folding motion itself causes the gathering together of longitudinal elements of the wing.

The following description is given as an example of a preferred embodiment with reference to the accompanying drawing, in which:

Fig. 1 is a lateral view in elevation of the airplane adapted for high speed flight showing the subsonic wing folded;

Fig. 2 is a corresponding front view;

Fig. 4 is a detail in perspective;

Fig. 5 shows apart the control of the motion of the wing;

Fig. 6 is a partial transverse section of the front element of the wing;

Fig. 7 is a section made along line 7—7 of Fig. 6;

Fig. 8 is a view similar to Fig. 6 showing the adjacent element;

Fig. 9 is a partial transverse section of the wing showing its elements in their protracted position;

Fig. 10 is a view similar to Fig. 9, showing the elements telescoped one within the other;

Fig. 11 is a transverse section showing the mechanism to control the retraction of a part of the outer surfaces of one element in view of the folding operation;

Fig. 12 is a plan view showing the wing near its articulation to the fuselage in protracted position;

Fig. 13 is a similar view showing the wing in the folded position;

Fig. 16 is a general schematic view of the framework of the wing.

Figure 3:
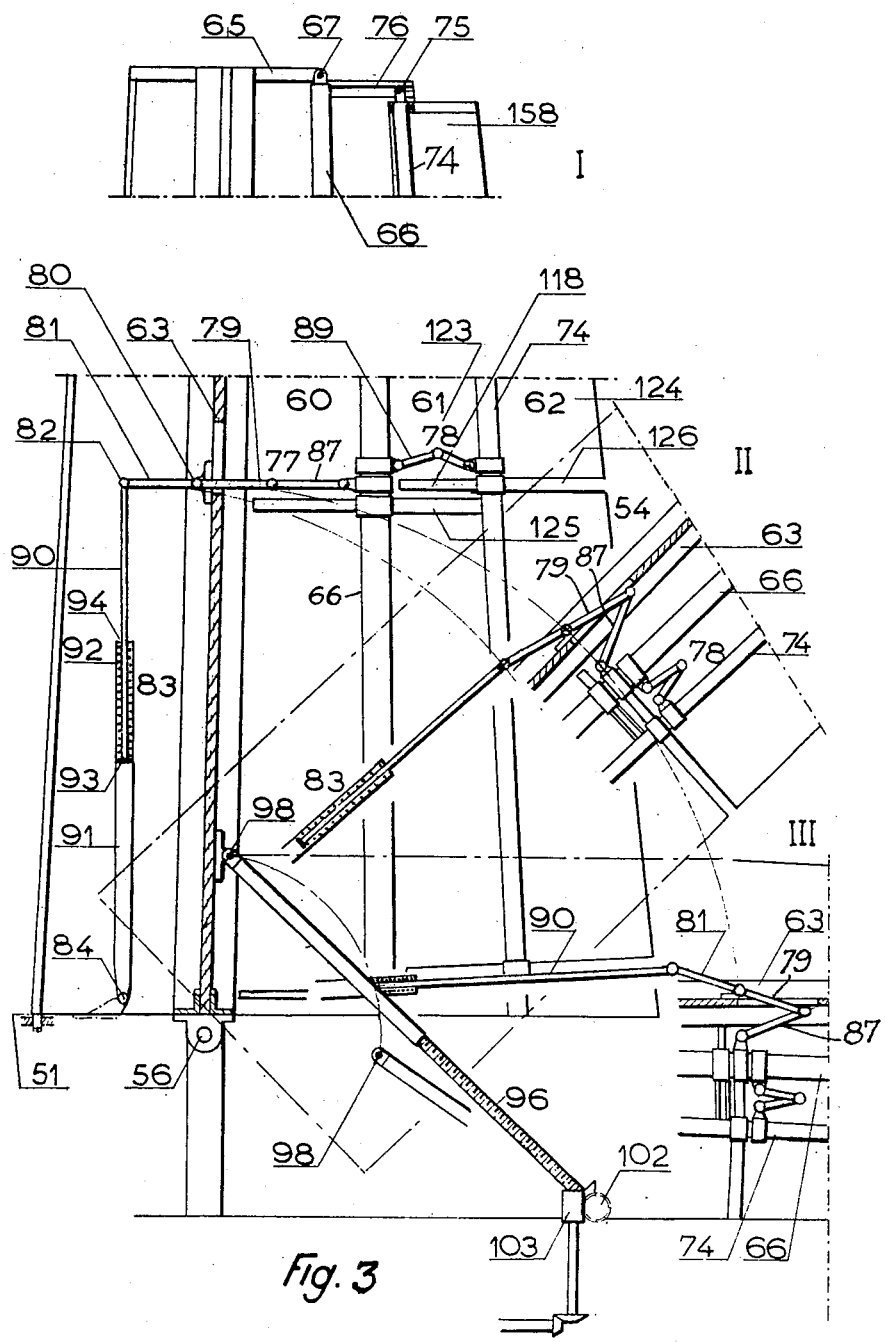
Fig. 3 is a view in elevation showing the main frame elements of the wing respectively for the extended position, the intermediate position and the folded position.

The pilot is lodged in the nose 50 of the airplane. This nose is fixed to the fuselage 51, on which are mounted on the one hand the supersonic wing 52, used for flight at very high speed, which may be greater than the speed of sound and on the other hand subsonic wing 53 utilized for the flight at relatively low speed.

In order to pass from subsonic flight to supersonic flight, each half 54 and 55 of the subsonic wing is folded within the fuselage, as shown in Fig. 1 by rotation about axis 56 and 57 fixed to the fuselage.

In this embodiment, the folded subsonic wing is not completely lodged within the fuselage, but only partially. Fairings 58 and 59 are then provided in the front and eventually at the rear of the wing, so as to maintain the aerodynamic continuity of streamline of the airplane.

In this embodiment, the wing is constituted (Fig. 3) by a plurality of longitudinal elements, three in the example shown, which in the extended position form a surface capable of providing lift to the airplane for the speeds considered. Fig. 3 shows in a general way (position I) the wing after the rotation either of the whole airplane or of only a part thereof which brings it to the non-lifting position in which folding is possible.

In the example shown, the half-wing is constituted by three longitudinal elements 60, 61 and 62. The element 60, which comprises the leading edge, is the frame or resisting element. It comprises essentially a spar 63, which extends throughout the length of the wing and on which is mounted the attachment 55 to the fuselage. Ribs such as 64, the details of which will be described more completely hereafter in connection with Figs. 6 and 7, transmit to the spar the stresses received by the elements that these ribs support. On an end-rib 65 of the element 60 is mounted the element 61. The frame-work of this latter is constituted by a tubular member 66 pivotally mounted about a pin 67 substantially parallel to the axis 56. This mounting is shown in detail in Fig. 4 in which it can be seen that the tube 66 is engaged at its end on an extension 68, in which is provided a passage 69 for the pin 67, which insures the pivotal connection to the rib 65. This latter is provided to that effect with two perforated ears 70 and 71. This mounting of the extension 68 is designed to allow for a rotation of the tube 66 about its axis for a reason which will be hereafter detailed. A lug 72 rigid with the extension 68 cooperates with a button-hole 73 of the tube 66 for avoiding separation of the tube and extension.

The rear element 62 comprises likewise a tubular frame member 74 which is mounted on the element 61 in the same manner that the tube 66 is mounted on the element 60, by pivotal connection about a pin 75 on the end-rib 76 of the element 61.

The elements 60, 61 and 62 are further connected together by one or more compass-systems. Such a system is shown on Fig. 3; it comprises two compasses, one of which, 77, is interposed between the spar 63 and the tube 66 and the other of which, 78, between the tube 66 and the tube 74. These compasses insure in this extended position the resistance to the torsion stresses applied on the tubes 66 and 74.

Through these compasses likewise, one controls the insertion of the longitudinal elements 60, 61 and 62, the one within the other in view of minimizing the depth of the wing in folded position. This contraction of the wing may be achieved either before folding or during folding. It can be achieved either by independent power means or as a consequence of the general folding movement of the wing.

In the embodiment shown, the branch 79 of the compass 77 pivotally mounted as at 80 on the spar 63 (slotted to give it passage) is extended by an arm 81. At the end 82 of this arm is pivotally mounted the extremity of a pulling rod 83, the other extremity of which is pivotally mounted as at 84 on the fuselage 51 of the airplane.

The axes 56 and 84 are located in such a way that when the wing 54 rotates about the axis 56 for folding, the pulling rod 83 exerts a pull on the arm 81 thus causing the closure of the compass 77 and consequently the insertion of the element 61 within the element 60.

A kinematic connection is provided between the compass 77 and the compass 78. This connection is such that the closure or opening of one causes the closure or the opening of the other. In the example shown, this connection is constituted by a connecting rod 85 (Fig. 15) interposed between, on the one hand an elbowed arm 86 rigid with the branch 87 of the compass 77 and, on the other hand, an elbowed arm 88 rigid with the branch 89 of the compass 78.

As shown in Fig. 3, the telescoping of the elements 61 and 62 within the element 60 is terminated as soon as the wing 54 passes from the extended position I to an intermediate position II. As the folding movement continues, the pulling rod 83 extends and the telescoping of the elements one within the other is maintained.

To that effect, the pulling rod 83 is formed by two elements 90 and 91 capable of sliding one within the other. A compression spring 92 interposed between a washer 93 on the end of the rod 90 and a stop 94 forming the extremity of the tube 91 opposes the extension of the connecting rod 83. The power of this spring is chosen in such a way that during the first phase of the folding movement, it prevents the extension of the connecting rod 83, permitting it thus to control the telescoping of the elements 61 and 62 in the element 60. During the second phase of the movement, i. e. for the passage of the wing 54 from the position II to the position III, the spring 83 is compressed, allowing thus the extension of the pulling rod 83.

The folding movement in the illustrated embodiment is controlled by a telescopic system. This system comprises two telescopic screws 95 and 96, which are symmetrically arranged with respect to the median plane 97 of the spar 63 (Fig. 5) and hinged to the latter by a pivot 98. These screws 95 and 96 are driven by a shaft 99 through pairs of conical pinions 100 and 101. On the shaft 99 is mounted an helicoidal wheel 102, meshing with a tangential screw 103 (Fig. 3) rotated by power means not shown.

So as to minimized the space occupied within the fuselage, the distance between the telescopic screws 95 and 96 is relatively small, and may even be, as in the example shown, inferior to the thickness of the elements of the wing that it is adapted to embrace.

Referring now to Figs. 7 and 8, it can be seen that this distance is smaller than the thickness of the wing element 61 determined by the distance between the outer linings of the latter. These linings are, on the necessary length of the wing, constituted by plates 103 and 104 pivoted on hinges 105 and 106 formed on the rear edge of the element 61 in combination with supports 107 and 108 rigid with the tube 66.

Any suitable means, for instance hydraulic means, are provided to control the closing or opening motions of the plates 103 and 104. In the example shown, the plates 103 and 104 are provided with reinforcing members 109 and 110 on which are hinged hydraulic jacks, respectively 111 and 112, the other extremities of which are mounted on a collar 113 rigid with the tube 66. Preferably each jack, when extended, has a length larger than the half-thickness of the wing at this place, which allows for a travel suited to ensure a sufficient closing up of the elements 103 and 104. Before the folding up of the wing, the jacks 111 and 112 are protracted, which allows for the passage of the plates 103 and 104 between the telescopic screws 95 and 96.

The tubular member 66 is supported longitudinally by ribs such as 64 (Figs. 6 and 7) rigid with the support 63. To that effect, the ribs are provided with an elongated opening 114, the opposed edges 115 and 116 of which are parallel and form sliding guides for a slide 117 constituting a bearing for the tube 66. The width of the guides 115 and 116 is larger than the thickness of the slide 117 (Fig. 7), so as to afford the latter the freedom of movement required for the rotation of tube 66 about the axis 67 during folding.

In a similar way, the tube 74 (Fig. 8), which constitutes the frame of the rear element 62, is supported longitudinally by guide-ribs 118, rigid with the tube 66. These guide-ribs are provided with an opening 119, the parallel edges 120 and 121 of which form the sliding guides for a slide 122 in which is formed a bearing for the tube 74.

The upper and lower coverings 123 and 124 of the elements 61 and 62 present opposite the guide-ribs 64 and 118 openings 125 and 126 (Fig. 16) which permit telescoping of the element 62 within the element 61 and together within the element 60 in spite of said guide-ribs.

According to a further feature of this embodiment the elements 61 and 62 are used as flaps, for instance as landing flaps and in this respect the invention concerns a control device for the operation of these flaps.

Figure 14:
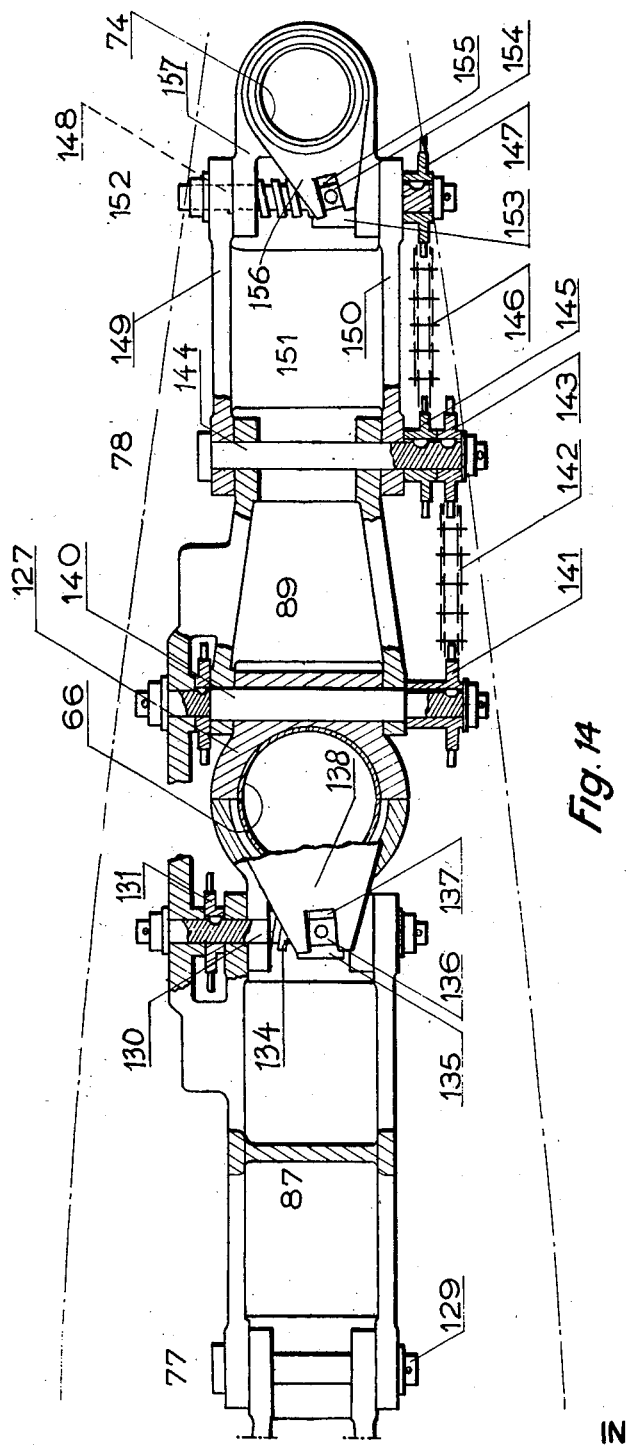
Fig. 14 is a section showing the mechanism for the control of the folding and the control of the angular adjustment of the different elements of the wing.
Figure 15:
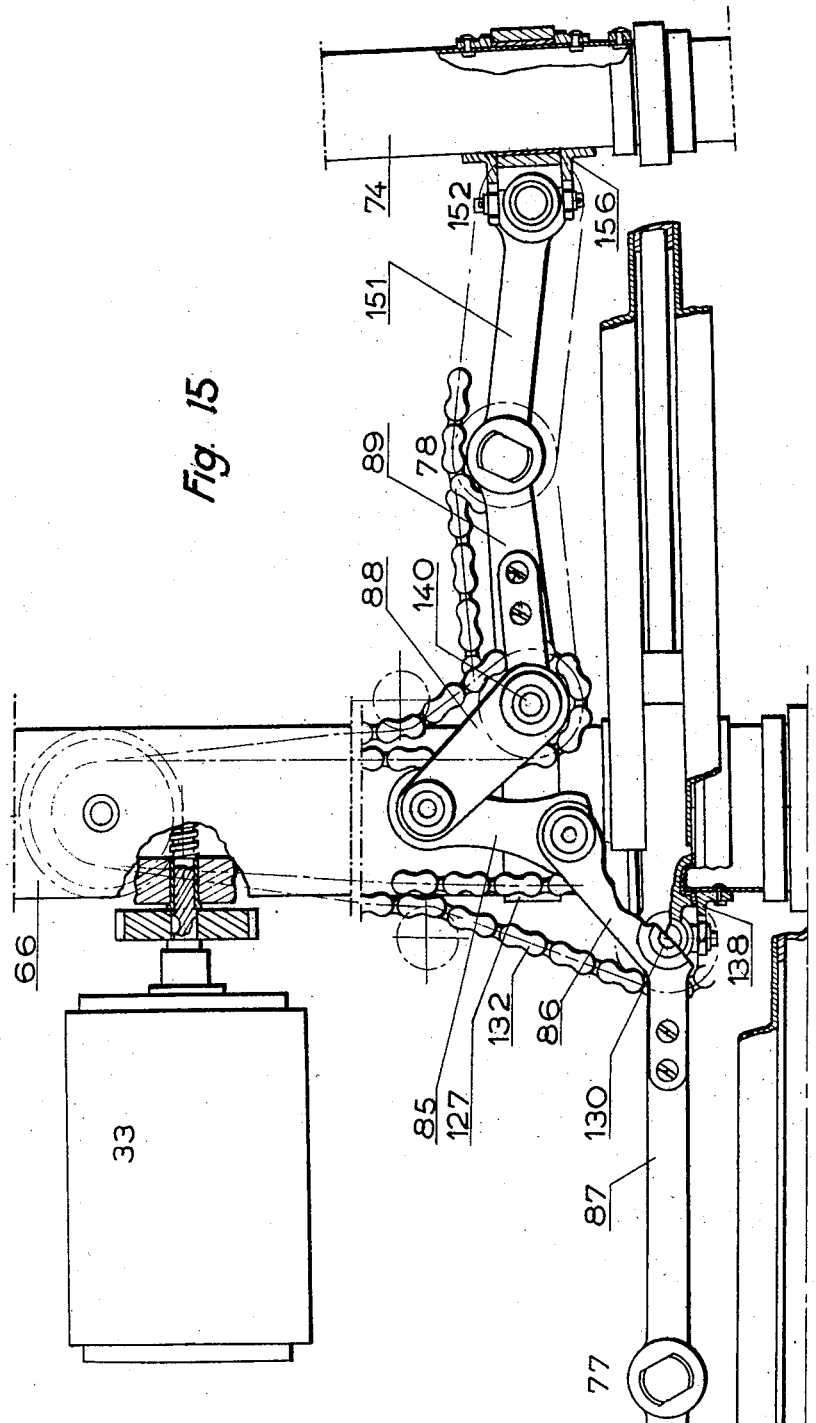
Fig. 15 is a corresponding plan view.

To that effect, the connections between the compasses 77 and 78 and the tubes 66 and 74 are set through bearings (Figs. 14 and 15). The branch 87 of the compass 77, which is of I-section, is mounted at one of its ends on the pivot 129 of the compass, its other extremity being crossed by a shaft 130. On the shaft 130 is keyed a pinion 131 which may be driven by means of a chain 132, itself driven for instance by an electric motor 33 carried by the tube 66. The shaft 130 is threaded on a part of its length 134, so as to cooperate with the corresponding tap of a nut 135. This nut carries a head with faces 136 working in a corresponding notch 137 of a collar 138 rigid with the tube 66.

When the shaft 130 (which cannot move axially) rotates under the action of the pinion 131, the nut 135 moves along said shaft, for instance rises along it, and starts the rotation of the tube 66 in its bearing-supports rigid with the spar 63. The member 61, rigid with the tube 66, is therefore angularly displaced with respect to the member 60 of the wing 54 as soon as the motor 33 is started.

The angular displacement of the member 62 with respect to the member 61 is controlled in a similar way. A collar 127, rigid with the tube 66, is crossed by a shaft 140 on which is keyed a pinion 141 driven by the motor 33. Said pinion 141 transmits its movement through a chain 142, a pinion 143 secured on the axis 144 of the compass 78, a second pinion 145 secured on said axis and a chain 146, to a pinion 147 secured on a shaft 148. This shaft 148 is carried between two arms 149 and 150 of the branch 151 of the compass 78. By means of a thread 152 of the shaft 148, the latter drives longitudinally a tapped nut 153 provided with a faced head 154 engaged in a corresponding notch 155 of a collar 156 rigid with tube 74. The fork or yoke 157 used for the attachment of the arm 151 of the compass is on the contrary rotatively mounted on the tube 74.

When the shaft 148 rotates, the nut 153 sets in rotation the tube 74 with respect to its bearing-supports rigid with the wing member 61, which ensures the correct angular displacement of the rear member 62 with respect to the member 61.

Thus, the start of the motor 33, by effecting the rotation of the shafts 130 and 148 through the transmission system shown, causes the angular displacement of the member 61 with respect to the member 60 and simultaneously the angular displacement of the member 62 with respect to the member 61, allowing thereby a landing of the airplane at a sufficiently reduced speed. The ratios between the elements of the transmission are such that the angles of these displacements are at suitable rates.

To the extreme left, the member is formed by a warping aileron 158 (Fig. 16) rotatively mounted on the tube 74.

I claim:

1. In an airplane having a fuselage: a wing retractable along said fuselage comprising a plurality of longitudinal wing sections positioned one behind the other, pivot means on the foremost wing section rotatively connecting the wing to the fuselage, bracing means between said foremost section and said fuselage, second pivot means between two consecutive wing sections at the outer ends thereof, said wing sections being adapted to open up and close fanwise by pivotal movement about their outer ends, and means for supporting each wing section for sliding movement at its inner end on the adjacent wing section located forwardly thereof.

2. In an airplane having a fuselage and a pivotal wing consisting of a plurality of longitudinal wing sections positioned one behind the other: a forward wing section comprising a wing spar, means for pivotally connecting said spar with said fuselage, bracing means between said spar and said fuselage, transverse ribs integral with said spar; rear wing sections each comprising a longitudinal framework member, transverse ribs integral with each longitudinal framework member, means pivotally connecting the outlying ribs of two consecutive wing sections, and means for slidably supporting a longitudinal framework member of a rearward section in the wing ribs of the adjacent forward section.

3. Airplane as in claim 2, wherein the framework members are tubular and are supported for rotation in the said wing-rib sliding supporting means.

4. In a pivotal airplane wing: a foremost wing section comprising a wing spar, an inboard and an outboard wing rib secured to said spar transversely thereof, wing-pivoting means on said spar substantially at the attachment thereof with said inboard rib, and second pivotal means on said outboard rib at the rearward portion thereof; a rear wing section juxtaposed longitudinally to said foremost wing section and pivoted thereon by said second pivotal means; and means for slidably supporting said rear wing section on said inboard wing rib.

5. In an airplane wing: a foremost wing section comprising a wing spar, a first inboard wing rib and an outboard wing rib integral with said spar; an intermediate wing section longitudinally juxtaposed to said foremost wing section and comprising a first longitudinal framework member, a second inboard wing rib and a second outboard wing rib on said first longitudinal framework member; pivotal connecting means between said first outboard rib and said first longitudinal framework member rearwardly of said foremost wing section; means for slidably supporting said intermediate wing section on said first inboard rib; a rearmost wing section comprising a second longitudinal framework member, a third inboard wing rib and a third outboard wing rib supported by said second longitudinal framework member; pivotal connecting means between said second outboard rib and said second longitudinal framework member, and means for slidably supporting said rearmost wing section on said second inboard wing rib.

6. In an airplane wing: a foremost wing section comprising a wing spar and a plurality of transverse wing ribs spaced along and secured to said spar; a rearward wing section longitudinally juxtaposed to said foremost wing section comprising a longitudinal framework member; journals on said framework member; bearings on said wing ribs cooperating with said journals; means for sliding said bearings along said ribs; pivotal connecting means between the outer rib of said plurality and said framework member; a second plurality of transverse ribs spaced along said framework member; and a support member interposed between said pivotal means and said framework member and co-axially rotative relatively to said framework member.

7. Airplane wing as in claim 5, wherein the rearmost wing section comprises an aileron mounted for rotation on said second framework member.

8. In an airplane having a fuselage and a wing retractable along said fuselage: a foremost wing section comprising a wing spar, a pivotal connection between said fuselage and said spar, two parallel jacks between said fuselage and said spar for rotating said foremost wing section about said pivotal connection, said jacks being spaced apart in a vertical plane, a rear wing section longitudinally juxtaposed to said foremost wing section and comprising panels respectively on the upper and under wing surfaces of said rear wing section and means for moving said panels closer together to allow said rear wing section to pass between said jacks, a longitudinal framework member, means for supporting said rear wing section for transverse sliding movement inside said foremost wing section and between said jacks, a pivoted linkage system connecting said spar and said framework member and tie-rod means between said pivoted linkage system and said fuselage.

9. Airplane as in claim 8, wherein the tie-rod means is longitudinally resiliently expansible, the force required to expand said tie-rod means being greater than that required to slide the said rear wing section into said foremost wing section.

ROGER AIMÉ ROBERT.

REFERENCES CITED

The following references are of record in the file of this patent:

UNITED STATES PATENTS

| Number | Name | Date |
|---|---|---|
| 1,427,257 | Bowen et al. | Aug. 29, 1922 |
| 1,615,682 | Clark | Jan. 25, 1927 |
| 1,810,762 | Gish | June 16, 1931 |

FOREIGN PATENTS

| Number | Country | Date |
|---|---|---|
| 168,334 | Switzerland | June 16, 1934 |
| 454,556 | Great Britain | Sept. 28, 1936 |